J. PARR.
GUIDE ROLLERS FOR ENDLESS APRONS.

No. 169,573. Patented Nov. 2, 1875.

Witnesses.
John Becker
Fred. Haynes

Joseph Parr
by his Attorneys
Brown & Allen

UNITED STATES PATENT OFFICE.

JOSEPH PARR, OF NEW YORK, N. Y., ASSIGNOR TO LYDIA ANN McCOLLUM, SOLE EXECUTRIX AND TRUSTEE OF THE ESTATE OF JOHN McCOLLUM, DECEASED.

IMPROVEMENT IN GUIDE-ROLLERS FOR ENDLESS APRONS.

Specification forming part of Letters Patent No. 169,573, dated November 2, 1875; application filed September 28, 1875.

*To all whom it may concern:*

Be it known that I, JOSEPH PARR, of New York, in the county and State of New York, have invented an Improvement in Guide-Rollers for Endless Aprons; and I do hereby declare that the following is a full, clear, and exact description of the same, reference being had to the accompanying drawing, in which—

Figure 1:
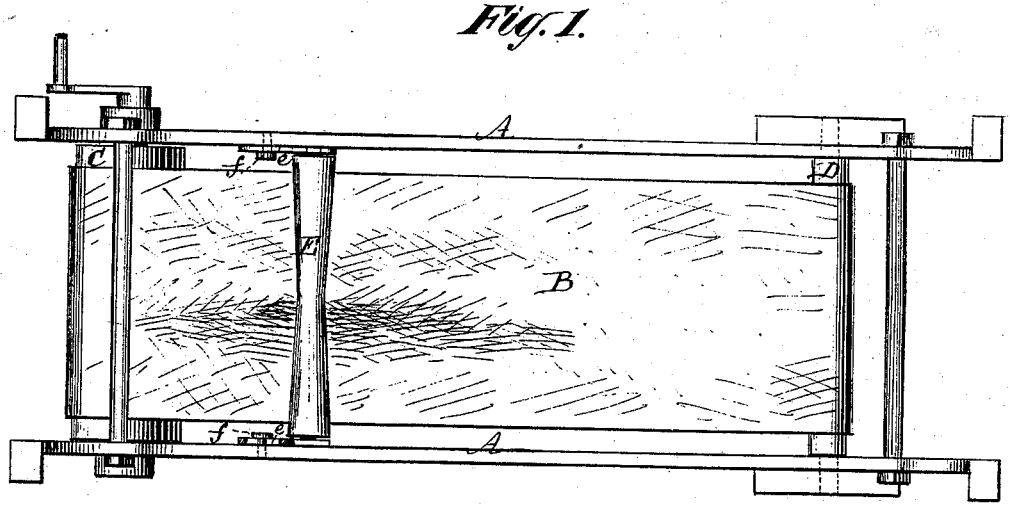
Figure 2:
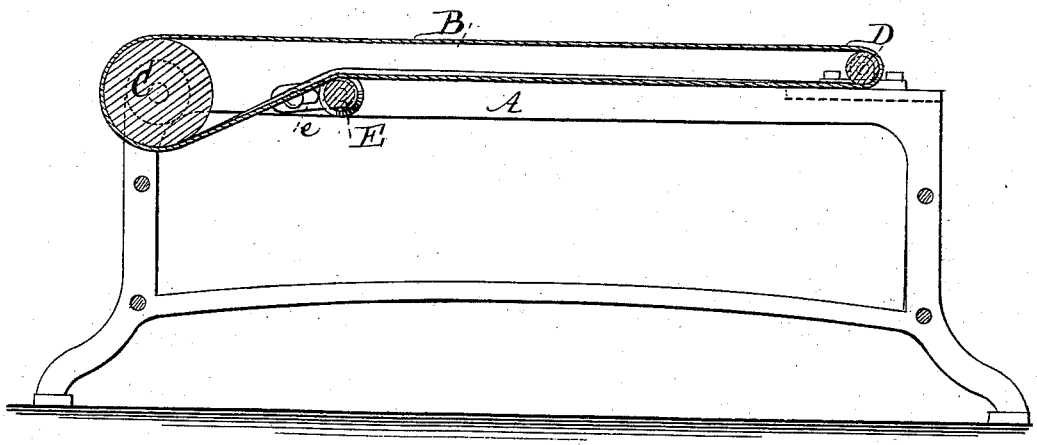

Figure 1 is a view of the under side of an endless apron with my improved roller applied thereto. Fig. 2 is a vertical section, longitudinally of the apron and transversely of the roller.

The object of my invention is to prevent lateral deviation of an endless apron from the line of travel; and it consists in a novel construction of the roller, whereby the apron is caused to travel in a straight line. Heretofore, in order to accomplish this object, guide-rollers having flanges at or near their ends have been used, or the rollers around which the apron passed have been provided with flanges for the purpose of guiding the apron; but in such cases the flanges caused the edges of the apron to curl and wear out speedily. This disadvantage is obviated in my invention by constructing the guide-roller with a concave longitudinal profile, the contact of which with the apron causes it to travel in a straight line without wearing, curling, or otherwise injuring the edge of the apron.

The drawing represents an apron, B, passing around rollers C D, having their bearing in a frame, A, of any ordinary construction. The guide-roller E has its bearings in slotted arms e, attached to the frame A by screw-bolts f, by which means the axis of the roller may be accurately adjusted. The surface of the roller is concave, and the concavity may be a regular curve, or a double conical surface, as shown. There may be any suitable number of guide-rollers used, arranged at any suitable points. The roller E is here shown as arranged near the principal apron-roller C, and bearing against the undermost portion of the apron. As the apron travels around the rollers C D, in the usual manner, the pressure of the concave surface of the guide-roller E prevents lateral deviation of the apron, and causes it to travel in a straight line, while the concave form of the guide-roller prevents the edges of the apron from curling or becoming worn to any greater extent than the other portion. The apron-rollers C D may be either barrel-shaped or perfectly cylindrical without affecting the operation of the guide-roller. A guide-roller of the form and construction herein described may be used with advantage in connection with an endless apron of any description, and is particularly advantageous when used in a cracker-machine in connection with the apron which carries the dough and crackers.

What I claim as new, and desire to secure by Letters Patent, is—

The guide-roller E, having a concave longitudinal profile, and journaled at each end to the slotted arms e e, secured to the frame A by means of the bolts f, which allow said arms to be adjusted independently of each other, for the purpose of adjusting the roller to the belt, substantially as described.

JOSEPH PARR.

Witnesses:
BENJAMIN W. HOFFMAN,
FRED. HAYNES.